United States Patent [19]

Maddox

[11] Patent Number: 5,051,048
[45] Date of Patent: Sep. 24, 1991

[54] BLIND FASTENER

[75] Inventor: Charles G. Maddox, Kent, Ohio

[73] Assignee: The B. F. Goodrich Company, Akron, Ohio

[21] Appl. No.: 91,140

[22] Filed: Aug. 31, 1987

[51] Int. Cl.$^5$ ............................................. F16B 13/04
[52] U.S. Cl. ........................................ 411/34; 411/38
[58] Field of Search ................. 411/38, 37, 34–36, 411/55, 43, 40, 70, 41

[56] References Cited

U.S. PATENT DOCUMENTS

| 2,255,650 | 9/1941 | Burke | 411/38 X |
| 2,324,142 | 7/1943 | Eklund | 411/38 X |
| 2,384,347 | 9/1945 | Schutz | 411/38 X |
| 2,562,019 | 7/1951 | Colley | 411/38 |
| 2,763,314 | 9/1956 | Gill | 411/34 |
| 2,887,926 | 5/1959 | Edwards | 411/38 |
| 3,136,203 | 6/1964 | Davis | 411/38 |
| 3,348,444 | 10/1967 | Brignola | 411/38 |
| 3,461,771 | 8/1969 | Briles . | |
| 3,463,046 | 8/1969 | Welch et al. | 411/34 |
| 3,750,525 | 8/1973 | Waters et al. | 411/34 |
| 3,785,241 | 1/1974 | Fischer | 411/38 |
| 3,789,728 | 2/1974 | Shackelford . | |
| 4,177,710 | 12/1979 | Matuschek et al. | 411/34 |

FOREIGN PATENT DOCUMENTS

| 2953402 | 6/1981 | Fed. Rep. of Germany | 411/38 |
| 878521 | 10/1942 | France | 411/35 |
| 982415 | 1/1951 | France | 411/34 |
| 0579462 | 11/1977 | U.S.S.R. | 411/34 |
| 2120347 | 11/1983 | United Kingdom | 411/34 |

Primary Examiner—Lloyd A. Gall
Attorney, Agent, or Firm—Joseph Januszkiewicz

[57] ABSTRACT

A blind one piece expansible fastener which has a tubular body with an annular flanged head portion at one end thereof. The upper portion of the tubular body which extends from the flanged head portion has a constant wall thickness. The intermediate tubular portion of the fastener which can be upset has its wall thickness increasing towards the lower portion, which lower portion is internally threaded. The intermediate portion is buckled radially outwardly against an apertured work to secure the fastener thereto. The exterior diameter of the tubular body is of a constant diameter.

5 Claims, 2 Drawing Sheets

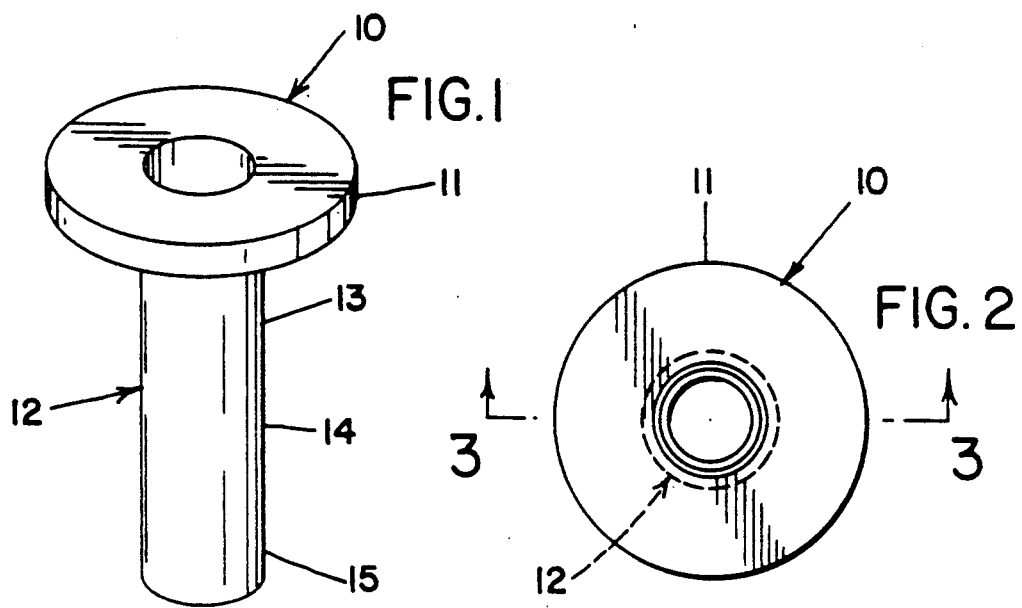
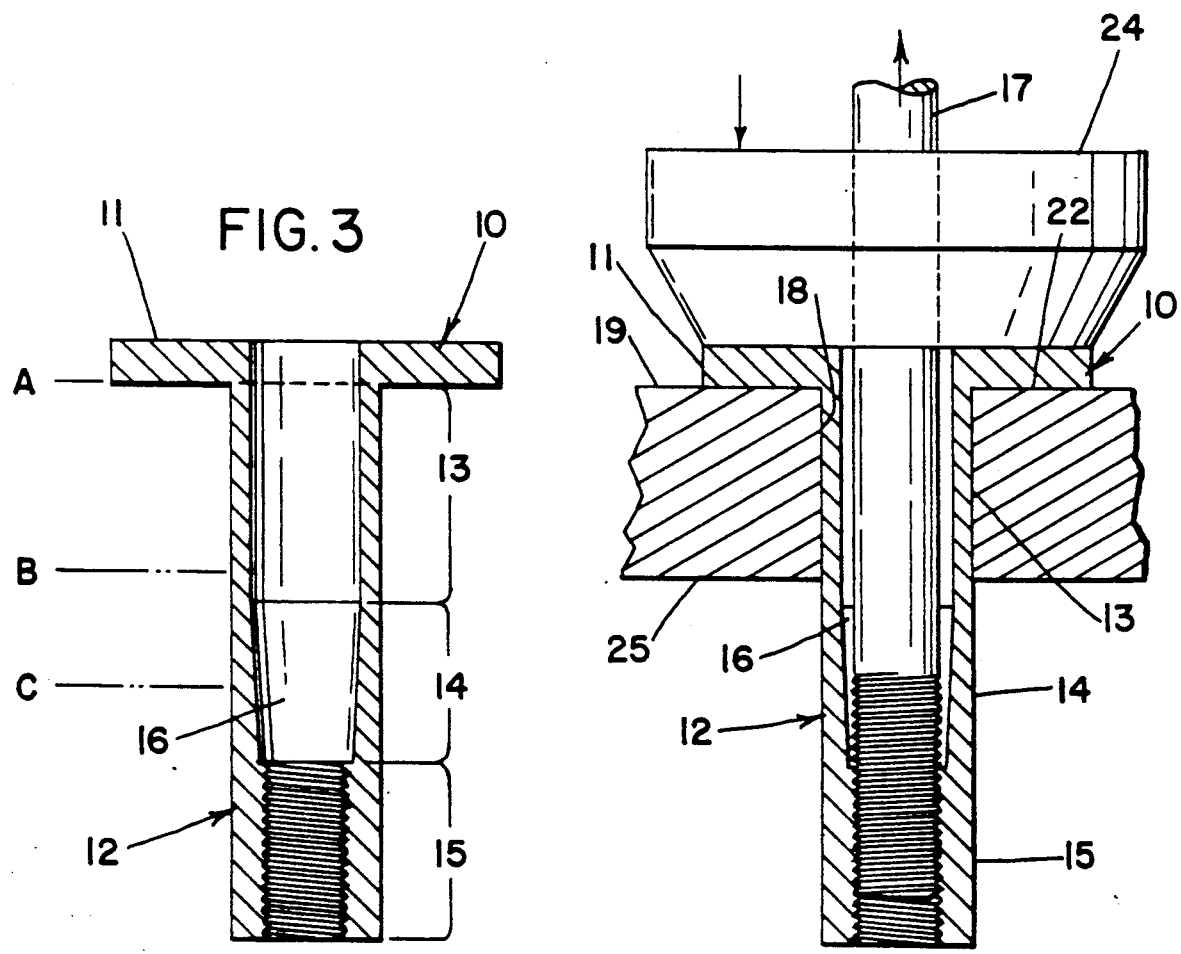

BLIND FASTENER

BACKGROUND OF THE INVENTION

This invention relates to fastener and more particularly to thread locking type blind hollow fasteners that can be installed entirely from one side of an apertured workpiece wherein the body portion of the hollow fastener has an intermediate portion that is tapered to control the upsetting or bulging of such intermediate portion of the fastener for use on a range of sizes or thicknesses of apertured workpieces. Such blind fasteners are used where it is not practical or possible to drill and tap the structure or where the other side of the structure is non-accessible.

Various designs of blind fasteners consisting of threaded tubular bodies which can be inserted through a hole in a structure and expanded to bear against the back or blind side of the structure have a threaded portion which will function as a stationary nut for fastening the desired external component. The upsetting process which expands that portion of the fastener against the back surface of the structure must be secure enough and complete to secure such fastener firmly. To prevent problems of rotation of the fastener where torquing of the screw is made it is important to assure the collapsing of that portion of the fastener against the bottom of the apertured workpiece by selecting the proper size and length of fastener body. The present invention contemplates the configuration of the intermediate hollow body portion of the fastener into a taper with the thinner portion thereof more closely to the head portion of the body portion to control the upsetting action of the fastener. If the workpiece is thicker the installation hole or apertured workpiece reinforces the thin intermediate portion of the taper and upset occurs at the thick portion of the taper. If the workpiece is thin, then the thin portion of the taper upsets first thus providing a single fastener that can accommodate variations in thickness of the workpiece. Such fasteners have particular advantage in composite materials where thickness typically varies greatly.

SUMMARY OF THE INVENTION

A blind one piece hollow fastener having a tubular body with a head portion extending radially outwardly at the one end thereof. The tubular body has an upper end portion of constant wall thickness, a lower threaded end portion and an intermediate portion whose wall thickness increases in thickness from the upper end portion to the lower threaded portion. Such tapered portion facilitates the use of such hollow fastener on a range of thickness of apertured workpieces.

BRIEF DESCRIPTION OF THE DRAWINGS

In the accompanying drawings,

FIG. 1 is a perspective view of a blind fastener;

FIG. 2 is a plan view of the blind fastener;

FIG. 3 is a view of the blind fastener in cross section taken on line 3—3 of FIG. 2;

FIG. 4 is a side elevational view of the blind fastener positioned in a short reach apertured workpiece with an upsetting tool shown positioned to perform an upsetting action;

DETAILED DESCRIPTION

Figure 5:
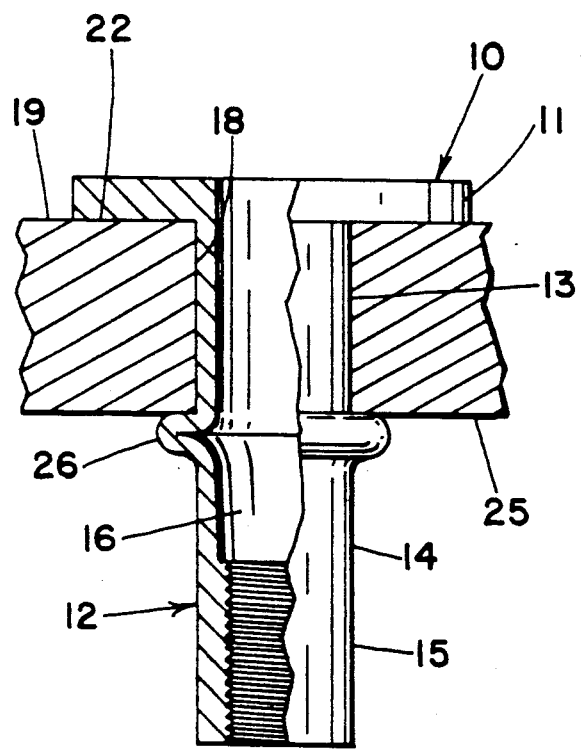
FIG. 5 is a view similar to FIG. 4 of the blind fastener in cross section in an installed condition on a given thickness of workpiece.

Referring to the drawings wherein like reference numerals refer to like elements in the several views, there is shown in FIG. 1 a blind fastener 10 having a flat annular head or flange 11 and a hollow tubular body 12 depending therefrom. The tubular body 12 of fastener 10 is a longitudinal extending shank or hollow cylindrical body having as shown in FIG. 3 an upper portion or first portion 13 that is integral with the head 11, an intermediate internally tapering portion 14 and an internally threaded end portion 15. The first portion or upper portion 13 is of constant uniform wall thickness from adjacent the head 11 to the beginning of the intermediate portion or second portion 14. The intermediate portion 14 tapers gently, or increases in wall thickness progressively towards the internally threaded end portion or third portion 15. The bore of the intermediate portion is a tapering bore 16 whose length is approximately equal to the length of the threaded end portion 15 and can also be equal to the length of the upper or first portion 13.

As seen in FIG. 3, the hollow fastener 10 can be used on a workpiece whose thickness ranges from a size extending from A to point B or from A to point C which is a sixty percent increase in thickness. The versatility of ranges that such fastener covers materially increases its usefulness and reduces inventory cost.

The fastener 10 is installed by screwing it onto the tip of a high strength threaded draw rod 17 and is inserted through a bore 18 in a structural plate member 19. The head 11 of the fastener is seated flush with the top surface 22 of the structural plate member 19. A non-rotatable anvil 24 is inserted over the draw rod 17 and bears against the flange 11 of fastener 10 as an upward tension is applied to the draw rod 17. The longitudinal pressure and force in the direction of the flange will cause the tapering portion of the tubular body 12 adjacent to bottom surface 25 of the plate member 19 to be upset or buckle until such buckled portion designated 26 (FIG. 5) is applied firmly against the blind surface 25 of the structural plate member 19 through which it is installed.

Figure 6:
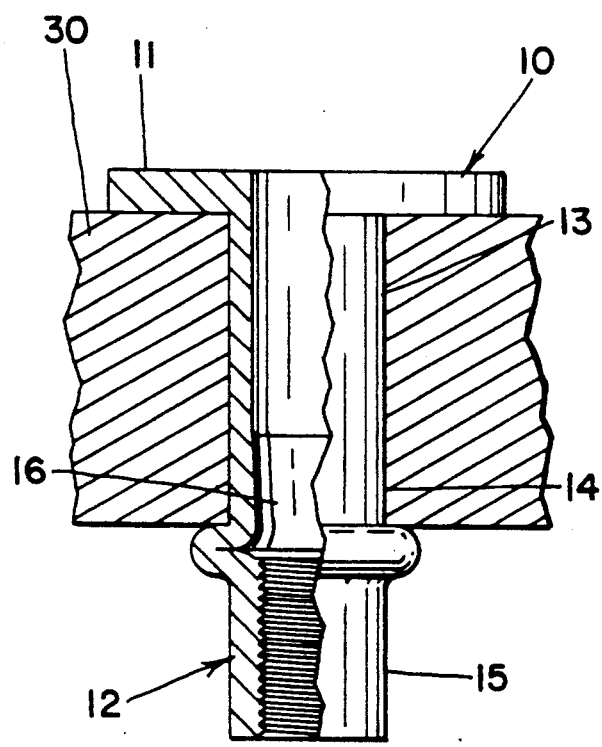
FIG. 6 is a view of the same blind fastener shown in FIG. 5 in cross section in a long reach installed condition on a workpiece that is thicker than that shown in FIG. 5.

As seen in FIG. 6, the same size hollow fastener 10 can be applied to a workpiece 30 that is substantially thicker than the workpiece 19 illustrated in FIGS. 4 and 5. This is due to the fact that the tapered bore 16 of the intermediate portion 14 which presents a wall thickness that increases progressively from the upper portion 13 to the end threaded portion 15. The tapered thickness controls the upsetting action of the intermediate portion such that the installation bore 18 reinforces the upper thin portion of the taper as in the workpiece 30 and the upset occurs in the thicker portion of the taper. However if the workpiece or substrate 19 is thinner as in FIG. 5, then the thinner portion of the intermediate tapering portion 14 will upset rather than the thicker portion. Such tapering of the intermediate portion provides a greater grip range for a single fastener which is particularly advantageous in composite materials where thicknesses can vary greatly.

The blind fastener 10 is now ready for receiving a screw or bolt to secure an external component such as a plate member to the structural plate member or workpiece 19 or 30 which can be firmly secured and torqued.

It will be apparent that although a specific embodiment of the invention has been described in detail, the invention is not limited to the specifically illustrated and described construction since variations may be made without departing from the principles of the invention.

I claim:

1. An integral one piece expansible hollow fastener for attachment to apertured work by operation from one side only of the work, said fastener comprising a tubular body, a head extending radially outwardly of said body at one end thereof, said tubular body having an upper longitudinally extending portion adjacent said head, said upper portion having a substantial uniform wall thickness, said tubular body having an intermediate longitudinally extending portion, said body having a lower end longitudinally extending portion opposite said head, said lower end portion having an internally threaded bore, and said wall thickness of said intermediate portion gently increasing in wall thickness from said upper portion to said lower end portion to define a long tapering bore whose wall portion is to be buckled radially outwardly against the apertured work by a pull-up tool insertable through the central bore of said tubular body.

2. An integral one piece expansible hollow fastener as set forth in claim 1 wherein the length of said intermediate portion is equal to or greater than the length of said lower internally threaded portion.

3. An integral one piece expansible hollow fastener as set forth in claim 1 wherein said intermediate portion is substantially the same length as said upper portion.

4. An integral one piece expansible hollow fastener as set forth in claim 1 wherein the length of said intermediate portion is approximately equal to said lower end longitudinally extending portion.

5. An integral one piece expansible hollow fastener as set forth in claim 1 wherein the length of said intermediate portion is substantially equal to said lower end longitudinally extending portion.

* * * * *